(12) United States Patent
Semper et al.

(10) Patent No.: US 7,280,500 B2
(45) Date of Patent: Oct. 9, 2007

(54) SYSTEM AND METHOD FOR SYNCHRONIZING BROADCAST TRANSMISSIONS FROM WIRELESS BASE STATIONS

(75) Inventors: William J. Semper, Richardson, TX (US); Purva R. Rajkotia, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1010 days.

(21) Appl. No.: 10/175,298

(22) Filed: Jun. 19, 2002

(65) Prior Publication Data
US 2003/0235181 A1 Dec. 25, 2003

(51) Int. Cl.
*H04Q 7/00* (2006.01)
*H04B 7/15* (2006.01)
*H04J 3/08* (2006.01)

(52) U.S. Cl. .............. 370/328; 370/315; 455/11.1; 455/13.1

(58) Field of Classification Search .................. None
See application file for complete search history.

(56) References Cited

U.S. PATENT DOCUMENTS

| | | | | |
|---|---|---|---|---|
| 5,519,759 | A * | 5/1996 | Heineck et al. | 455/422.1 |
| 5,613,211 | A * | 3/1997 | Matsuno | 455/502 |
| 6,108,519 | A * | 8/2000 | Nitta | 340/7.27 |
| 6,731,936 | B2 * | 5/2004 | Chen et al. | 455/437 |
| 2003/0130000 | A1 * | 7/2003 | Le et al. | 455/502 |

* cited by examiner

*Primary Examiner*—Huy D. Vu
*Assistant Examiner*—Clemence Han

(57) ABSTRACT

An apparatus for broadcasting packet data to a first wireless mobile station in a wireless network. The apparatus comprises: 1) a first broadcast controller for receiving from the first mobile station a first broadcast registration request associated with a first content server; and 2) a signaling controller capable, in response to commands from the first broadcast controller, of establishing a network communication link with, and receiving broadcast data packets from, the first content server. The signaling controller further notifies a second base station that the first base station is a broadcast center associated with the broadcast data packets from the first content server.

21 Claims, 5 Drawing Sheets

SYSTEM AND METHOD FOR SYNCHRONIZING BROADCAST TRANSMISSIONS FROM WIRELESS BASE STATIONS

TECHNICAL FIELD OF THE INVENTION

The present invention is directed, in general, to wireless networks and, more specifically, to a system for synchronizing the broadcasting of messages from two or more base stations of a wireless network.

BACKGROUND OF THE INVENTION

The radio frequency (RF) spectrum is a limited commodity. Only a small portion of the spectrum can be assigned to each communications industry. The assigned spectrum, therefore, must be used efficiently in order to allow as many frequency users as possible to have access to the spectrum. Multiple access modulation techniques are some of the most efficient techniques for utilizing the RF spectrum. Examples of such modulation techniques include time division multiple access (TDMA), frequency division multiple access (FDMA), and code division multiple access (CDMA).

In order to attract and retain subscribers, wireless service provider frequently introduce end-user services that are desirable to consumers. These end-user services may include broadcast services provided via the wireless networks. Broadcast services may include advertisements, live news, sports highlight and scores, entertainment broadcasts, and the like that are broadcast from wireless network base stations over a particular geographical area for a fixed length of time.

Broadcast services are likely to play a significant role in wireless networks of the future. However, this presents problems with regard to the efficient utilization of the hardware and software resources in the base stations of a wireless network. Each broadcast message transmitted by one or more sectors of a base station requires a channel element to transmit the message. If there are no mobile stations in the listening area of a base station sector that are subscribing to the broadcast message, the channel element transmitting the broadcast message in that base station sector is wasted. Furthermore, if broadcast messages are transmitted by different base station in the same general time frame, but are not precisely synchronized, a mobile station may receive several substantially unsynchronized broadcast signals that are all too weak or noisy to properly detect.

There is therefore a need in the art for improved systems and methods for transmitting broadcast messages to mobile stations in a wireless network. In particular, there is a need for an improved broadcast controller that minimizes the number of wireless channel resources that are required to perform a message broadcast. More particularly, there is a need for an improved broadcast controller that increases the likelihood that a mobile station will properly receive a broadcast message.

SUMMARY OF THE INVENTION

In order to use air interface resources as efficiently as possible, it is important to ensure that broadcast transmissions originating from several base stations simultaneously are synchronized. It is also important to make sure that transmissions are only sent from base stations which have mobile stations listening in the local area. The present invention provides a broadcast controller for use in a wireless network base station (BS) that uses modified and, in some cases, newly defined messages on inter-BS interfaces to synchronize broadcasts. The present invention enables a packet data based broadcast to be set up between multiple base stations, thus allowing a mobile station to receive the broadcast from multiple base stations simultaneously (and therefore increase the probability of successful reception). Additionally, broadcast messages are only transmitted from base stations that are actively communicating with at least one mobile station that is interested in receiving the broadcast messages.

To address the above-discussed deficiencies of the prior art, it is a primary object of the present invention to provide, for use in association with a first base station of a wireless network capable of communicating with wireless mobile stations located in a coverage area of the wireless network, an apparatus capable of broadcasting packet data to a first wireless mobile station. According to an advantageous embodiment of the present invention, the apparatus comprises: 1) a first broadcast controller capable of receiving from the first mobile station a first broadcast registration request associated with a first content server coupled to the wireless network via an external packet data network; and 2) a signaling controller capable, in response to commands from the first broadcast controller, of establishing a network communication link with, and receiving broadcast data packets from, the first content server, wherein the signaling controller is further capable of notifying a second base station that the first base station is a broadcast center associated with the broadcast data packets from the first content server.

According to one embodiment of the present invention, the apparatus is disposed in a base station controller associated with the first base station.

According to another embodiment of the present invention, the second base station is identified from a provisioned list of regional base stations associated with the first base station.

According to still another embodiment of the present invention, the provisioned list is associated with the first broadcast controller.

According to yet another embodiment of the present invention, the signaling controller is further capable of receiving from the second base station a broadcast join request to receive the broadcast data packets from the first content server, wherein the signaling controller, in response to the broadcast join request establishes a base station-base station link to the second base station and forwards the broadcast data packets to the second base station.

According to a further embodiment of the present invention, the base station-base station link is a handoff link.

According to a still further embodiment of the present invention, the signaling controller synchronizes a first wireless transmission of the broadcast data packets from the first base station and a second wireless transmission of the broadcast data packets from the second base station.

According to a yet further embodiment of the present invention, the broadcast controller determines a time duration between the first broadcast registration request and a subsequent broadcast registration request and, if the time duration exceeds a predetermined threshold, the first broadcast controller terminates the first wireless transmission.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
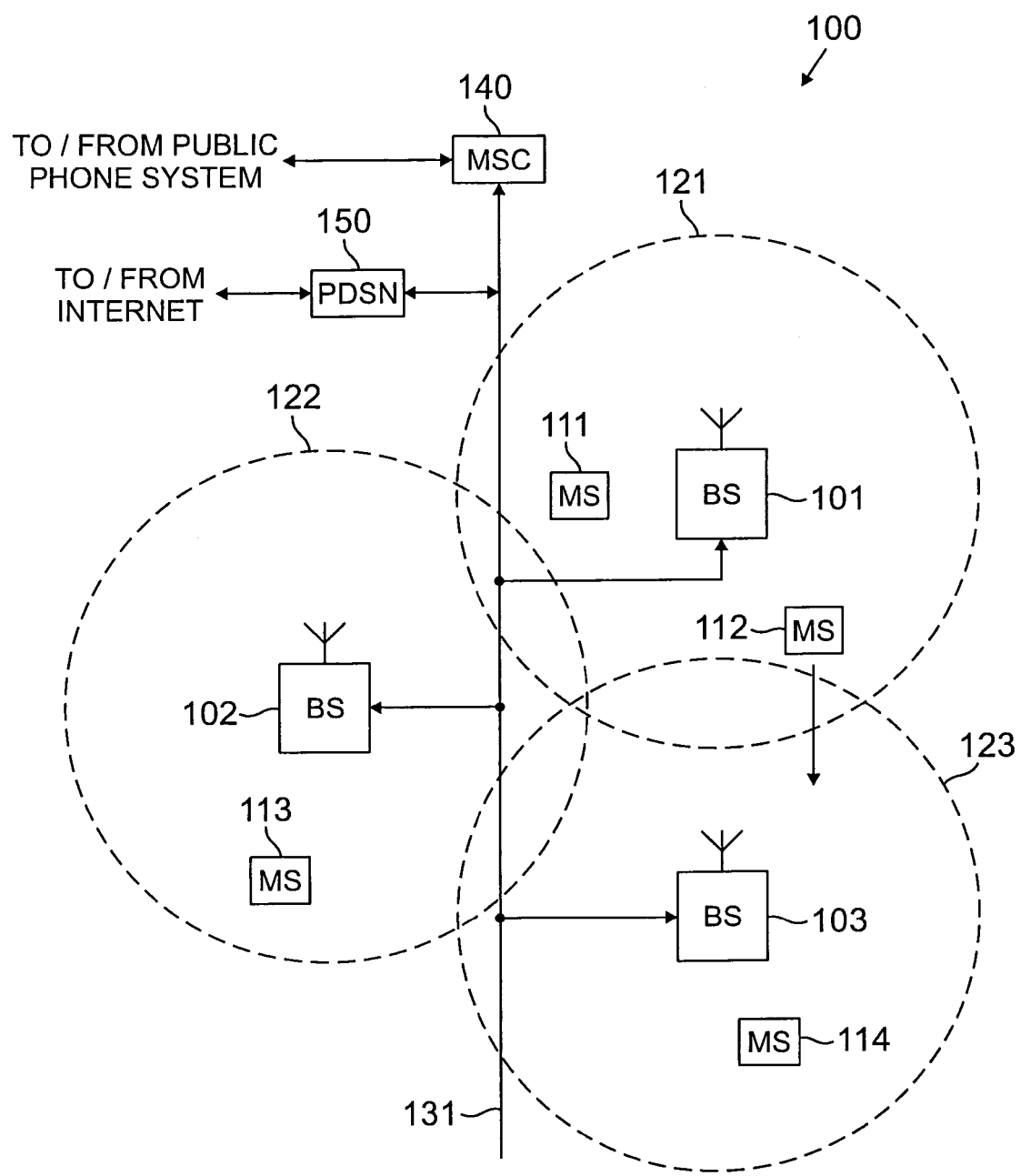
FIG. 1 illustrates exemplary wireless network according to one embodiment of the present invention.

FIG. 1 illustrates exemplary wireless network 100 according to one embodiment of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over, for example, code division multiple access (CDMA) channels. Mobile stations 111-114 may be any suitable wireless devices, including conventional cellular radiotelephones, PCS handset devices, personal digital assistants, portable computers, or metering devices. The present invention is not limited to mobile devices. Other types of access terminals, including fixed wireless terminals, may be used. However, for the sake of simplicity, only mobile stations are shown and discussed hereafter.

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), each sector being illuminated by a directional antenna coupled to the base station. The embodiment of FIG. 1 illustrates the base station in the center of the cell. Alternate embodiments position the directional antennas in corners of the sectors. The system of the present invention is not limited to any one cell site configuration.

In one embodiment of the present invention, BS 101, BS 102, and BS 103 comprise a base station controller (BSC) and one or more base transceiver subsystem(s) (BTS). Base station controllers and base transceiver subsystems are well known to those skilled in the art. A base station controller is a device that manages wireless communications resources, including the base transceiver stations, for specified cells within a wireless communications network. A base transceiver subsystem comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center MSC) 140. BS 101, BS 102 and BS 103 also transfer data signals, such as packet data, with the Internet (not shown) via communication line 131 and packet data serving node (PDSN) 150. Line 131 also provides the connection path to transfers control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. Those skilled in the art will recognize that the connections on line 131 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on line 131 may a provide a transmission path for transmission of analog or digital control signals in a suitable signaling protocol.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

As is well known, the hand-off procedure transfers control of a call from a first cell site to a second cell site. As MS 112 moves from cell 121 to cell 123, MS 112 detects the pilot signal from BS 103 and sends a Pilot Strength Measurement Message to BS 101. When the strength of the pilot transmitted by BS 103 and received and reported by MS 112 exceeds a threshold, BS 101 initiates a soft hand-off process by signaling the target BS 103 that a handoff is required as described in TIA/EIA IS-95 or TIA/EIA IS-2000.

BS 103 and MS 112 proceed to negotiate establishment of a communications link in the CDMA channel. Following establishment of the communications link between BS 103 and MS 112, MS 112 communicates with both BS 101 and BS 103 in a soft handoff mode. Those acquainted with the art will recognize that soft hand-off improves the performance on both forward (BS to MS) channel and reverse (MS to BS) channel links. When the signal from BS 101 falls below a predetermined signal strength threshold, MS 112 may then drop the link with BS 101 and only receive signals from BS 103. The call is thereby seamlessly transferred from BS 101 to BS 103.

The above-described soft hand-off assumes the mobile station is in a voice or data call. An idle hand-off is a hand-off of a mobile station, between cells sites, that is communicating in the control or paging channel.

According to an advantageous embodiment of the present invention, BS 101-BS 103 are capable of transmitting precisely synchronized broadcast messages to MS 111-MS 114. This is accomplished by means of broadcast controllers in the base station controllers of the base stations. The unique and novel broadcast controllers use modified or newly defined messages on inter-BS interfaces to synchronize broadcasts. The present invention enables a packet data broadcast to be set up between multiple base stations, thus allowing a mobile station to receive the broadcast from multiple base stations simultaneously. This increases the probability of successful reception. Additionally, broadcast messages are only transmitted from base stations that are actively communicating with at least one mobile station that is interested in receiving the broadcast messages.

Figure 2:
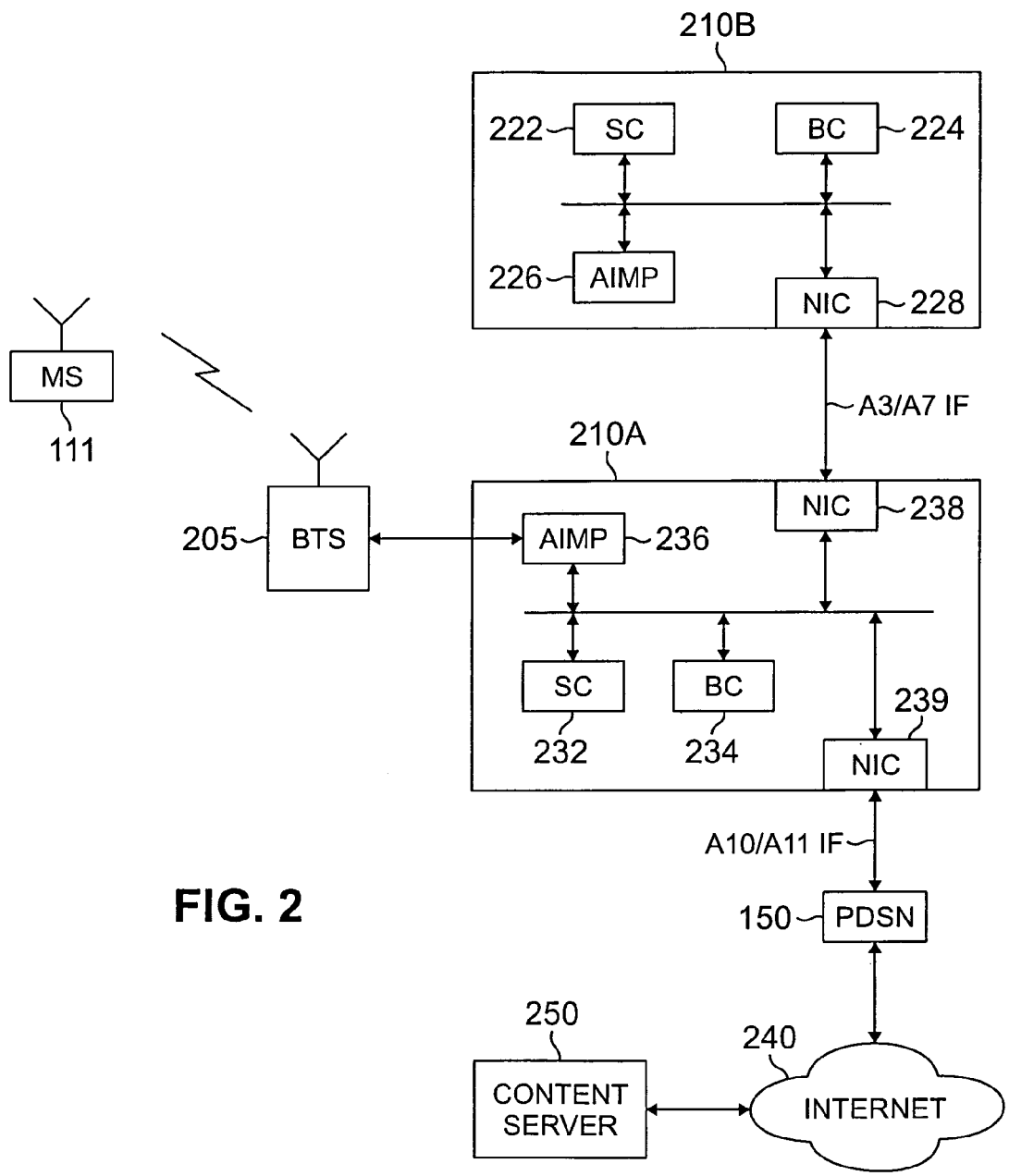
FIG. 2 illustrates selected portions of base station controllers operable to coordinate and synchronize the transmission of broadcast messages according to one embodiment of the present invention.

FIG. 2 illustrates selected portions of base station controllers 210A and 210B operable to coordinate and synchronize the transmission of broadcast messages according to one embodiment of the present invention. In FIG. 2, base station controller 210A and base transceiver subsystem (BTS) 205 are part of base station 101 and are operable to communicate with MS 111. Base station controller 210B is part of base station 103. Base station controller 210A comprises signaling controller (SC) 232, broadcast controller (BC) 234, air interface message processing (AIMP) controller 236, network interface card (NIC) 238, network interface card (NIC) 239. Base station controller 210B comprises signaling controller (SC) 222, broadcast controller (BC) 224, air interface message processing (AIMP) controller 226, and network interface card (NIC) 228.

According to an advantageous embodiment of the present invention, BC 234 and BC 224 are software applications that operate on data processors in base station controllers 210A and 210B, respectively. BC 234 and BC 224 communicate with signaling controllers 234 and 224, which create signaling messages for over-the-air transmissions (and other interfaces) and for AIMP controller 236 and AIMP controller 226, respectively. AIMP controller 236 and AIMP controller 226 process the messages received over the air from mobile stations. NIC 228 and NIC 238 control access to the network interfaces. The A3/A7 interface (IF) is the inter-BSC interface and the A10/A11 interface (IF) is the network interface to PDSN 150. PDSN 150 acts as a router forwarding packets to and from content server 250 via Internet 240 or some other packet data network.

The air interface between the mobile station and the base transceiver subsystem (BTS) is defined by the CDMA 2000 air interface standard (IS-2000). However, the interface between the BTS and the BSC may be proprietary and understanding its operation is, in any event, unnecessary to this disclosure. The network interfaces (A3/A7 and A10/A11) are defined in IS-2001.

In the message flow diagrams in FIGS. 3-5 below, the BTS and the BSC-BTS interface are not shown for the purpose of simplicity. Also, NIC 228, NIC 238 and NIC 239 are not shown in these message flow diagrams. It is assumed that the mobile user has obtained (via a regular packet data call) the required broadcast information from content server (CS) 250 located somewhere on Internet 240. This information will include such information as a description of the application and broadcast protocols and the broadcast IP address of content server 250.

In this example, it is assumed that the wireless service provider has configured the broadcast to be sent over a set geographical area that is known at each BSC. Each BSC knows which of its neighbors are involved in the broadcast. However, to conserve air resources, the broadcast is only transmitted on a BS when a mobile station has registered with that BS and requests (or is known to desire) the broadcast service.

Figure 3:
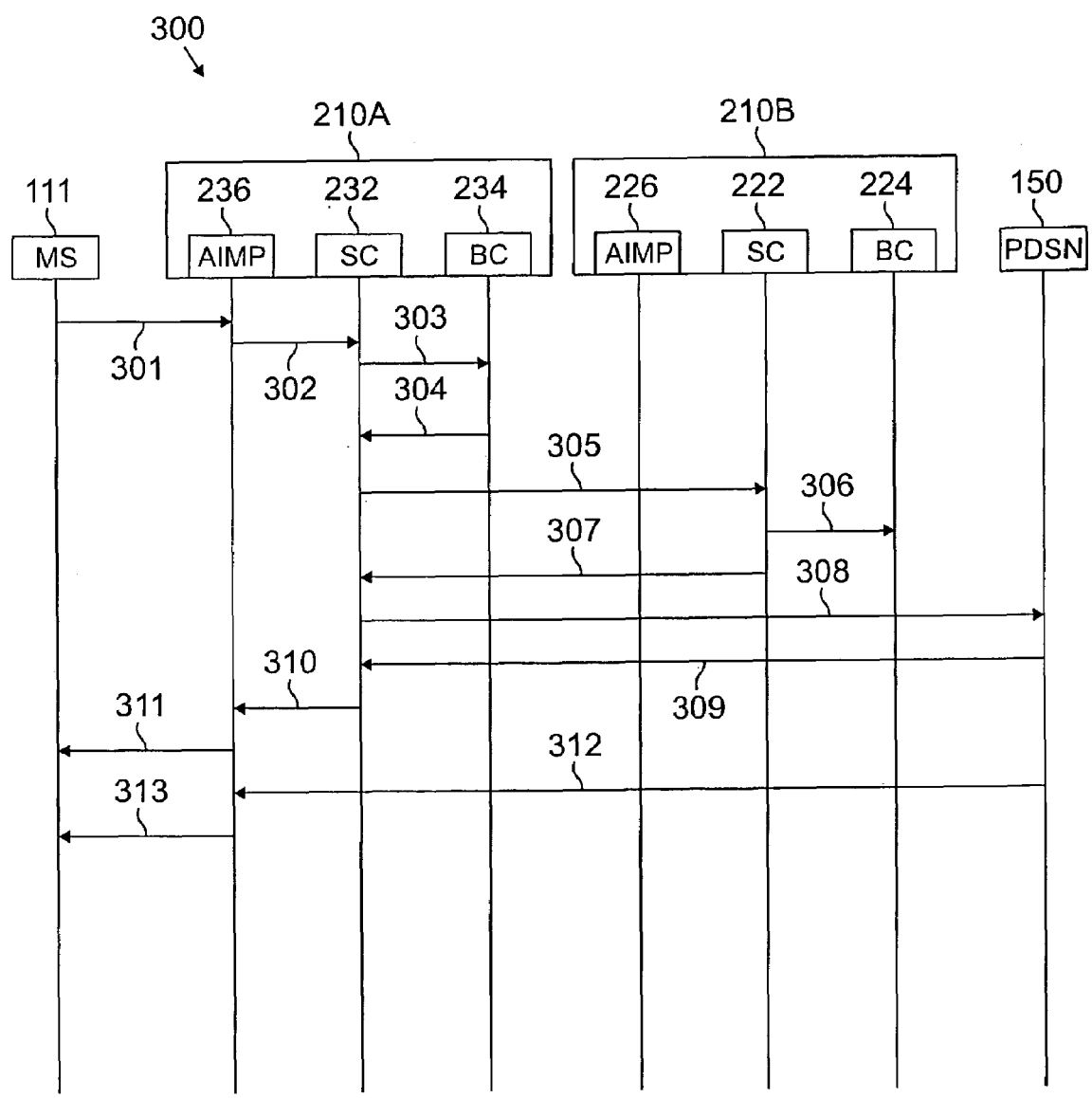
FIG. 3 is a message flow diagram illustrating a broadcast registration operation for a first mobile station according to one embodiment of the present invention.

FIG. 3 depicts message flow diagram 300, which illustrates a broadcast registration operation for a first mobile station according to one embodiment of the present invention. In this example, MS 111 registers with BSC 210A and asks to receive the broadcast. Since BSC 210A is the first BSC with which a mobile station registers for a particular broadcast service, BSC 210A is designated the "Broadcast Center" for this broadcast in this region. As Broadcast Center, BSC 210A is responsible for setting up a connection to PDSN 150 to receive the broadcast data from the packet data network (i.e., Internet 240). After receiving the broadcast data, the Broadcast Center, BSC 210A, synchronizes the broadcast transmission on all BSCs that are involved in the broadcast. This is critical, if the broadcast is to be received in soft handoff from multiple BSCs by the mobile station. The initial broadcast set up is as follows:

1. Mobile station 111 registers with AIMP controller 236 in BSC 210A using an over-the-air broadcast registration message 301.

2. AIMP controller 236 processes Broadcast Registration message 301 and sends the contents (i.e., broadcast registration information) to signaling controller (SC) 232 in message 302.

3. SC 232 realizes that registration is for a broadcast service and notifies broadcast controller (BC) 234 in message 303.

4. Since this is the first user for the service, BC 234 alerts SC 232 via message 304 to set up the necessary interfaces. This is done according to a provisioned list stored in BSC 210A. This provisioned list identifies neighboring base stations that will participate in the broadcast.

5. SC 232 sends A7-Broadcast Advertisement message 305 to BSC 210B, another BSC that is considered to be in the broadcast area. Message 305 informs the target BSC that the source BSC (i.e., BSC 210A) will be considered the Broadcast Center for this broadcast. Message 305 also contains information about the broadcast itself.

6. SC 222 on target BSC 210B notifies BC 224 via message 306 that SC 222 has received A7-Broadcast Advertisement message 305. This alerts BSC 224 to the fact that BC 224 may have to join the broadcast at some point.

7. SC 222 in BSC 210B sends A7-Broadcast Advertisement Acknowledgment message 307 to the Broadcast Center (i.e., BSC 210A), acknowledging the receipt of A7-Broadcast Advertisement message 305.

8. SC 232 in BSC 210A sends A11-Registration Request message 308 to PDSN 150, requesting the establishment of an A10 connection. Message 308 contains information enabling PDSN 150 to register with a multicast router in the packet data network (i.e., Internet 240), so PDSN 150 can receive packets involved in the broadcast.

9. PDSN 150 sends A11-Registration Response message 309 to BSC 210A, indicating the successful establishment of the A10 connection. Following this, PDSN 150 advertises itself to the multicast router that is forwarding packets for the broadcast.

10. SC 232 prepares the Broadcast Service Parameters message (BSPM) 310 based on the broadcast information received from BC 234. Message 310 is sent to AIMP controller 236 for transmission over the air to MS 111.

11. AIMP controller 236 transmits BSPM 311 over the air to the MS 111 via a paging channel. Message 311 contains the overhead parameters needed for the mobile to tune into the broadcast channel.

12. Thereafter, broadcast data arrives from PDSN 150 via message(s) 312 to be broadcast to MS 111.

13. AIMP controller 236 transmits the broadcast data over the air to mobile station 111.

Another mobile station can be added to the broadcast on BSC 210A by simply sending a registration message to the Broadcast Center, namely BSC 210A. Since BSC 210A is the Broadcast Center for this broadcast, it can simply send the BSPM to the new mobile station (e.g., MS 114) over the paging channel, allowing the new mobile station to tune in to the broadcast.

Figure 4:
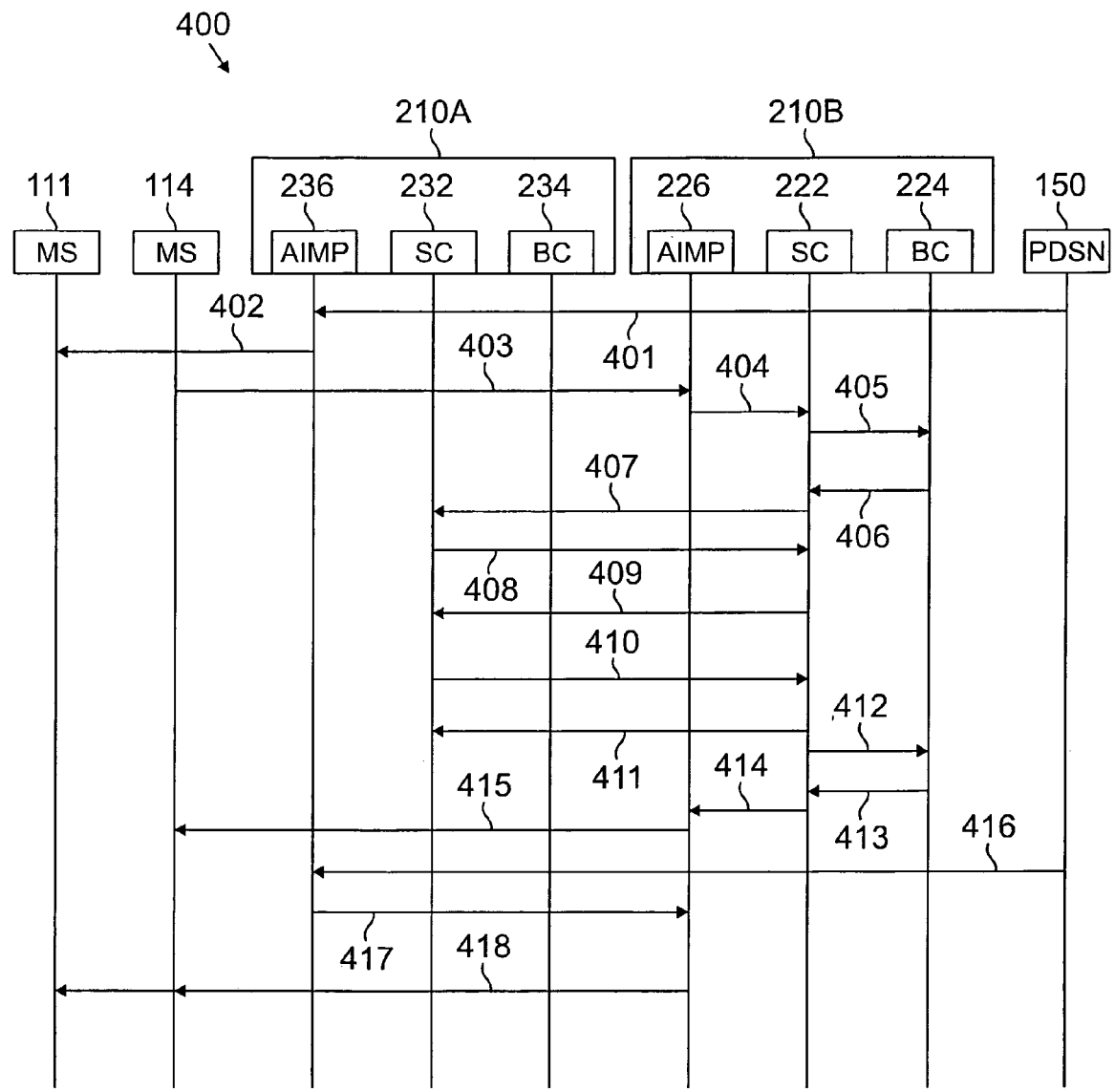
FIG. 4 is a message flow diagram illustrating a broadcast registration operation for a subsequent mobile station according to one embodiment of the present invention.

FIG. 4 is a message flow diagram illustrating a broadcast registration operation for a subsequent mobile station according to one embodiment of the present invention. If a new mobile station (i.e., MS 114) is added to a neighboring BSC (i.e., BSC 210B), a connection must be established to the Broadcast Center (i.e., BSC 210A). This is demonstrated below:

1. A broadcast (messages 401 and 402) is currently in progress on BSC 210A, which was designated the Broadcast Center in FIG. 3 above.

2. Mobile station (MS) 114 registers with BSC 210B via broadcast registration message 403.

3. AIMP controller 226 processes message 403 and sends result to SC 222 via message 404.

4. SC 222 realizes this is a registration request for a broadcast and alerts BC 224 via message 405.

5. Since BC 224 received earlier a broadcast advertisement from BSC 210A, BC 224 is aware that there is a Broadcast Center (i.e., BSC 210-A) in the regional area. BC 224 requests that SC 222 set up an A3 connection to the Broadcast Center via message 406.

6. SC 222 in BSC 210B sends A7-Soft Hand-Off (SHO) Leg Addition Request message 407 to SC 232 in BSC 210A.

7. SC 232 in BSC 210A sends A7-Hand-Off Request message 408 to SC 222 in BSC 210B to initiate a SHO leg addition for the broadcast. Message 408 includes information about all BSCs currently involved in the broadcast.

8. SC 222 in BSC 210B sends A3-Connect message 409 to SC 232 in BSC 210A to establish the A3 connection for the broadcast.

9. SC 232 in BSC 210A sends A3-Connect Acknowledgment message 410 to acknowledge establishment of the A3 connection.

10. SC 222 in BSC 210B sends A7-HO Request Acknowledgment message 411 to acknowledge the successful addition of the SHO leg.

11. SC 222 in BSC 210A alerts BC 224 that the SHO leg has been established via message 412.

12. BC 224 tells SC 222 via message 413 to send a BSPM over the paging channel to the mobile so it can begin to listen to the broadcast.

13. SC 222 then creates Broadcast Service Parameter Message (BSPM) 414 with overhead parameters for the broadcast and sends BSPM 414 to AIMP controller 226 for transmission to MS 114.

14. BSC 210B sends BSPM 415 to MS 114 on the paging channel. Message 415 indicates all BSCs currently involved in the Broadcast.

15. Broadcast data in message 416 arriving at AIMP controller 236 in the Broadcast Center (i.e., BSC 210A) must be replicated and time stamped for transmission on the SHO leg BSC.

16. The replicated broadcast data is sent via message 417 over the A3 connection to AIMP controller 226 in BSC 210B.

17. At the synchronized time, BSC 210A and BSC 210B transmit the broadcast data in messages 418.

Mobile stations may move during the broadcast, but as long as the mobile stations remain in the geographical broadcast area, the mobile stations should continue to receive the broadcast. Each mobile station maintains an internal timer that may expire, causing the mobile station to re-register with the strongest sector the mobile station is seeing. If this sector belongs to a base station currently transmitting the broadcast, the mobile station will be sent a Broadcast Service Parameter Message (BPSM) over the paging channel and will begin to decode the broadcast from this new base station, along with any other base stations that are advertised in the BPSM that the mobile station can see. If the mobile station roams to a base station that is not currently actively involved in the broadcast, but which has received a broadcast advertisement from a Broadcast Center, the mobile station will be added to the broadcast as in the above description.

Figure 5:
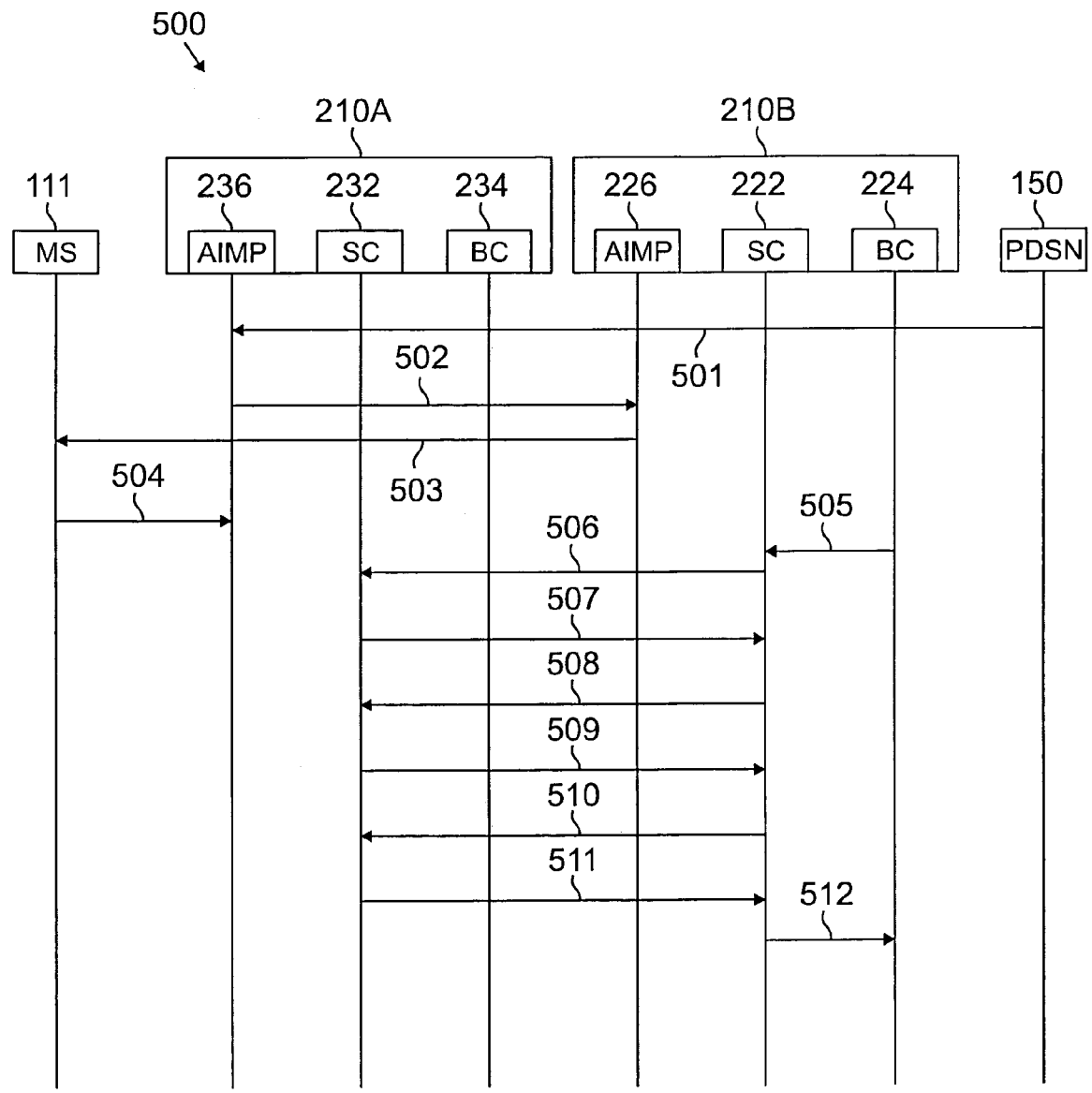
FIG. 5 is a message flow diagram illustrating a broadcast termination operation for one portion of a broadcast transmission according to one embodiment of the present invention.

FIG. 5 is a message flow diagram illustrating a broadcast termination operation for one portion of a broadcast transmission according to one embodiment of the present invention. Each broadcast controller maintains a timer that is reset after a mobile station registers for the broadcast on that base station. This can be either a first user for the broadcast on the base station or an additional mobile station to a broadcast already in progress). If the timer expires before a mobile station registration is received, the base station assumes that no one is listening to the broadcast in its area and terminates the broadcast transmission. As long as there is a mobile station in the broadcast region that is receiving the broadcast, the Broadcast Center must maintain the SHO leg to that sector and the A10 connection to PDSN 150. However, the Broadcast Center does not need to continue to transmit the broadcast on its own sectors.

If there have been no user registrations on a target base station and the internal timer in the corresponding broadcast controller for that base station expires, the target base station should request that the SHO leg be removed. This is performed as follow:

1. Initially, BSC 210B is involved in a broadcast with Broadcast Center BSC 210A as shown by messages 501, 502, and 503.

2. Mobile station (MS) 111 registers with BSC 210A only after its internal timer expires via message 504.

3. The timer in BC 224 in BSC 210B expires. Since no mobile station (i.e., MS 114) has registered since the last time the timer was reset, BC 224 transmits message 505 to SC 222 notifying SC 222 to tear down the SHO leg because there are no mobile stations in the area still tuned to the broadcast.

4. SC 222 in BSC 210B sends A7-Target Removal Request message 506 to SC 232 in BSC 210A indicating that the broadcast SHO is to be dropped.

5. SC 232 in BSC 210A sends A7-Drop Target message 507 to SC 222 in BSC 210B.

6. SC 222 in BSC 210B sends A3-Remove message 508 to SC 232 in BSC 210A to initiate removal of the A3 connection for the broadcast SHO leg.

7. SC 232 in BSC 210A sends A3-Remove Acknowledgment message 509 to SC 222 in BSC 210B to acknowledge removal of the A3 connection for the broadcast SHO leg.

8. SC 222 in BSC 210B sends A7-Drop Target Acknowledgment message 510 to SC 232 in BSC 210A to acknowledge successful removal of the broadcast SHO leg.

9. SC 232 in BSC 210A sends A7-Target Removal Response message 511 to acknowledge the request to remove the SHO leg.

10. SC 222 in BSC 210B signals BC 224 in BSC 210B via message 512 that the SHO leg has been removed and the broadcast has ceased on BSC 210B.

Although the present invention has been described in detail, those skilled in the art should understand that they can make various changes, substitutions and alterations herein without departing from the spirit and scope of the invention in its broadest form.

What is claimed is:

1. For use in association with a first base station of a wireless network to communicate with a plurality of wireless mobile stations located in a coverage area of the wireless network, an apparatus to broadcast packet data to a first one of said wireless mobile stations comprising:

a first broadcast controller to receive from said first mobile station a first broadcast registration request associated with a first content server coupled to said wireless network via an external packet data network; and a signaling controller, in response to commands from said first broadcast controller, establishes a network communication link with, and receives broadcast data packets from, said first content server, wherein said signaling controller notifies a second base station that said first base station is a broadcast center associated with said broadcast data packets from said first content server, and wherein in response to said notification, said signaling controller receives a broadcast join request from said second base station to receive said broadcast data packets from said first content server.

2. The apparatus as set forth in claim 1 wherein said apparatus is disposed in a base station controller associated with said first base station.

3. The apparatus as set forth in claim 2 wherein said second base station is identified from a provisioned list of regional base stations associated with said first base station.

4. The apparatus as set forth in claim 3 wherein said provisioned list is associated with said first broadcast controller.

5. The apparatus as set forth in claim 4 wherein said signaling controller, in response to said broadcast join request, establishes a base station-base station link to said second base station and forwards said broadcast data packets to said second base station.

6. The apparatus as set forth in claim 5 wherein said base station-base station link is a handoff link.

7. The apparatus as set forth in claim 6 wherein said signaling controller synchronizes a first wireless transmission of said broadcast data packets from said first base station and a second wireless transmission of said broadcast data packets from said second base station.

8. The apparatus as set forth in claim 7 wherein said broadcast controller determines a time duration between said first broadcast registration request and a subsequent broadcast registration request and, if said time duration exceeds a predetermined threshold, said first broadcast controller terminates said first wireless transmission.

9. A wireless network comprising:

a plurality of base station to communicate with a plurality of wireless mobile stations located in a coverage area of said wireless network, wherein a first one of the plurality of base stations comprises:

an apparatus to broadcast packet data to a first one of said wireless mobile stations comprising:

a first broadcast controller to receive from said first mobile station a first broadcast registration request associated with a first content server coupled to said wireless network via an external packet data network; and a signaling controller, in response to commands from said first broadcast controller, establishes a network communication link with, and receive broadcast data packets from, said first content server, wherein said signaling controller notifies a second base station that said first base station is a broadcast center associated with said broadcast data packets from said first content server, and wherein in response to said notification, said signaling controller receives a broadcast join request from said second base station to receive said broadcast data packets from said first content server.

10. The wireless network as set forth in claim 9 wherein said apparatus is disposed in a base station controller associated with said first base station.

11. The wireless network as set forth in claim 10 wherein said second base station is identified from a provisioned list of regional base stations associated with said first base station.

12. The wireless network as set forth in claim 11 wherein said provisioned list is associated with said first broadcast controller.

13. The wireless network as set forth in claim 12 wherein said signaling controller, in response to said broadcast join request establishes a base station-base station link to said second base station and forwards said broadcast data packets to said second base station.

14. The wireless network as set forth in claim 13 wherein said base station-base station link is a handoff link.

15. The wireless network as set forth in claim 14 wherein said signaling controller synchronizes a first wireless transmission of said broadcast data packets from said first base station and a second wireless transmission of said broadcast data packets from said second base station.

16. The wireless network as set forth in claim 15 wherein said broadcast controller determines a time duration between said first broadcast registration request and a subsequent broadcast registration request and, if said time duration exceeds a predetermined threshold, said first broadcast controller terminates said first wireless transmission.

17. In a first base station of a wireless network to communicate with a plurality of wireless mobile stations located in a coverage area of the wireless network, a method of broadcasting packet data to a first one of the wireless mobile stations comprising the steps of:

in the first base station, receiving from the first mobile station a first broadcast registration request associated with a first content server coupled to the wireless network via an external packet data network;

in response to the first broadcast registration request, establishing a network communication link with the first content server;

receiving broadcast data packets from the first content server;

notifying a second base station that the first base station is a broadcast center associated with the broadcast data packets from the first content server; and receiving from said second base station a broadcast join request to receive said broadcast data packets from said first content server.

18. The method as set forth in claim 17 further comprising the steps of:

in response to the broadcast join request, establishing a base station-base station link to the second base station; and forwarding the broadcast data packets to the second base station.

19. The method as set forth in claim 18 wherein the base station-base station link is a handoff link.

20. The method as set forth in claim 19 further comprising the step of synchronizing a first wireless transmission of the broadcast data packets from the first base station and a second wireless transmission of the broadcast data packets from the second base station.

21. The method as set forth in claim 20 further comprising the steps of:

determining a time duration between the first broadcast registration request and a subsequent broadcast registration request; and if the time duration exceeds a predetermined threshold, terminating the first wireless transmission.

* * * * *